US011410632B2

(12) United States Patent
Atkinson

(10) Patent No.: US 11,410,632 B2
(45) Date of Patent: Aug. 9, 2022

(54) DISPLAY DEVICES INCLUDING SWITCHES FOR SELECTING COLUMN PIXEL DATA

(71) Applicant: Hewlett-Packard Development Company, L.P., Spring, TX (US)

(72) Inventor: Lee Atkinson, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/045,772

(22) PCT Filed: Apr. 24, 2018

(86) PCT No.: PCT/US2018/029015
§ 371 (c)(1),
(2) Date: Oct. 7, 2020

(87) PCT Pub. No.: WO2019/209257
PCT Pub. Date: Oct. 31, 2019

(65) Prior Publication Data
US 2021/0166656 A1    Jun. 3, 2021

(51) Int. Cl.
*G06F 13/14* (2006.01)
*G09G 5/36* (2006.01)
(Continued)

(52) U.S. Cl.
CPC .............. *G09G 5/363* (2013.01); *G09G 3/20* (2013.01); *G06F 3/013* (2013.01);
(Continued)

(58) Field of Classification Search
CPC ..... G09G 2310/0297; G09G 2310/027; G09G 3/3275; G09G 3/3685; G09G 3/3611;
(Continued)

(56) References Cited

U.S. PATENT DOCUMENTS 6,049,321 A * 4/2000 Sasaki ................. G09G 3/3688
345/99
6,940,496 B1 * 9/2005 Kim ..................... G09G 3/3611
315/169.1
(Continued)

FOREIGN PATENT DOCUMENTS

WO    WO-2004063916 A3    4/2005
WO    WO-2017214671      12/2017
WO      2018/035045 A1    2/2018

OTHER PUBLICATIONS

Progress In Astronautics and Aeronautics: Satellite Communications In the 21st Century: Trends and Technologies.
(Continued)

*Primary Examiner* — Hau H Nguyen
(74) *Attorney, Agent, or Firm* — Tong Rea Bentley & Kim LLC

(57) ABSTRACT

A display device includes a plurality of pixels, a serial-to-parallel converter (SPC), a plurality of digital-to-analog converters (DACs), a plurality of switches, and a controller. The pixels are arranged in rows and columns. The columns include a first column and an adjacent second column. The SPC generates parallelized pixel data based on serial pixel data sent by a graphics controller. The DACs are coupled to the SPC and include a first DAC corresponding to the first column and a second DAC corresponding to the second column. The switches include a first switch that includes a first input coupled directly to an output of the SPC, a second input coupled to an input of the first column, and an output coupled to an input of the second column. The controller selects pixel data on one of the first input and the second input for output by the first switch.

9 Claims, 4 Drawing Sheets

200

| RESOLUTION xY | PIXEL 1-Y DATA | PIXEL (Y+1) - 2Y DATA | RESOLUTION x1 | PIXEL (2Y+1) DATA | ... | PIXEL X DATA |
|---|---|---|---|---|---|---|
| 202₁ | 202₂ | 202₃ | 202₄ | 202₅ | | 202ₐ |

(51) Int. Cl.
*G09G 3/20* (2006.01)
*G06F 3/01* (2006.01)

(52) U.S. Cl.
CPC . *G09G 2340/0407* (2013.01); *G09G 2350/00* (2013.01); *G09G 2370/10* (2013.01)

(58) Field of Classification Search
CPC ...... G09G 5/363; G09G 3/325; G09G 3/3283; G06F 3/013
See application file for complete search history.

(56) References Cited

U.S. PATENT DOCUMENTS

| | | |
|---|---|---|
| 8,300,956 B2 | 10/2012 | Luttmer et al. |
| 2003/0025658 A1 | 2/2003 | Janseen et al. |
| 2005/0018911 A1 | 1/2005 | Deever |
| 2006/0279498 A1 | 12/2006 | Kaneda et al. |
| 2014/0092006 A1 | 4/2014 | Boelter et al. |
| 2016/0267716 A1 | 9/2016 | Patel |
| 2017/0061928 A1 | 3/2017 | Kim |
| 2017/0193955 A1 | 7/2017 | Kim |
| 2017/0236466 A1 | 8/2017 | Spitzer et al. |
| 2018/0254226 A1* | 9/2018 | Iguchi .................... G09G 3/006 |

OTHER PUBLICATIONS

Ross V.S. Website development: HTML, CSS, PHP, MySQL. Textbook, part 1-MGDD (Yu) T, M.: 2010-107 p., p. 58.

\* cited by examiner

DISPLAY DEVICES INCLUDING SWITCHES FOR SELECTING COLUMN PIXEL DATA

BACKGROUND

Many display applications, including virtual reality (VR) applications that use head mounted displays (VR HMDs), obtain pixel data from a remote graphics controller. The remote graphics controller sends information for display in a plurality of packets, where each packet includes display data (e.g., red, green, and blue display levels) for one pixel of the display device.

DETAILED DESCRIPTION

The present disclosure broadly describes an apparatus, method, and non-transitory computer-readable medium for using switches in display devices to select column pixel data. As discussed above, many display applications, including virtual reality (VR) applications that use head mounted displays (VR HMDs), obtain pixel data from a remote graphics controller. The remote graphics controller sends information for display in a plurality of packets, where each packet includes display data (e.g., red, green, and blue display levels) for one pixel of the display device. Each packet is transmitted over a link (e.g., a wired cable or wireless network connection) between the remote graphics controller and the display device. The amount of link bandwidth consumed by the transmission of the packets is a function of the pixel count, the color depth, and the frame rate of the pixel data. As an example, the bandwidth consumed by transmitting pixel data to an HMD may be approximately twenty gigabits per second. As the amount of link bandwidth consumed approaches the total available link bandwidth, transmission of display data between the remote graphics controller and the display device may be slowed, resulting in a reduction in image fidelity.

Examples of the present disclosure reduce the link bandwidth consumed when transmitting pixel data from a remote graphics controller to a display device by allowing a single set of pixel data to be used by multiple pixels of the display device. In one example, columns of pixels in the display device include switches which allow for the selection of either new pixel data, or the pixel data from an adjacent column. A command included in the pixel data transmitted by the remote graphics controller may control selection by a switch of the appropriate pixel data. Thus, multiple pixels across a row may share the same pixel data. As such, the shared pixel data may be sent once for the entire group of pixels that share the pixel data, as opposed to sending individual pixel data for each of the pixels in the group. This may reduce the spatial resolution in areas of a display image where pixel data is shared; however, the reduction in spatial resolution may be limited to regions of the display image located on the periphery of a viewers gaze.

As such, examples of the present disclosure may be well suited to display applications that make use of foveated rendering techniques (i.e., techniques that track a viewers gaze and render portions of an image outside the center of the gaze at a lower fidelity to reduce power consumption and improve performance). For instance, examples of the present disclosure may be used to render images on head mounted displays. Examples of the present disclosure may also be used to render images on non-VR displays as well, including televisions, computer monitors, and other display devices for which link bandwidth between the display device and a remote image source may be limited.

Figure 1:
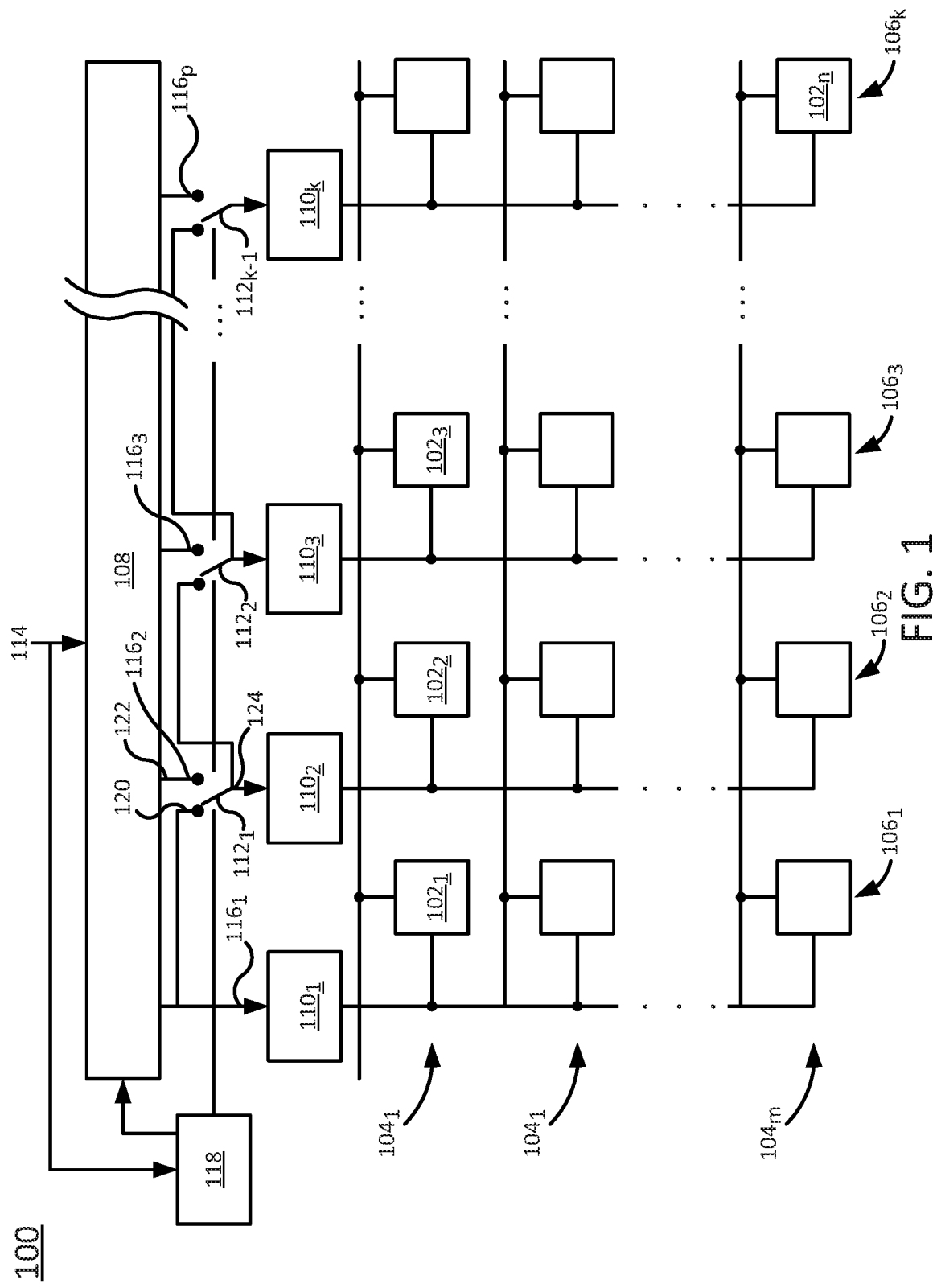
FIG. 1 depicts a high-level block diagram of an example display device of the present disclosure.

FIG. 1 depicts a high-level block diagram of an example display device 100 of the present disclosure. In one example, the display device 100 includes a plurality of pixels $102_1$-$102_n$ (hereinafter individually referred to as a "pixel 102" or collectively referred to as "pixels 102"). The plurality of pixels 102 includes at least a first pixel $102_1$ and a second pixel $102_2$. In one example, each pixel 102 is controllable to display a different color, where the color displayed by a pixel 102 may be represented by a plurality of component intensities, such as red, green, and blue (RGB) component intensities or cyan, magenta, yellow, and black (CMYK) component intensities.

The plurality of pixels is arranged in a plurality of rows $104_1$-$104_m$ (hereinafter individually referred to as a "row 104" or collectively referred to as "rows 104") and a plurality of columns $106_1$-$106_k$ (hereinafter individually referred to as a "column 106" or collectively referred to as "columns 106"). The plurality of rows 104 includes at least a first row $104_1$ and a second row $104_2$, while the plurality of columns 106 includes at least a first column $106_1$ and a second column $106_2$. The number of rows 104 may or may not be equal to the number of columns 106, depending on the display device. For example, for an HMD, the display typically includes fewer rows than columns. In one example, one pixel of the plurality of pixels resides at each intersection of a row 104 and column 106.

The display device 100 further includes a serial-to-parallel converter (SPC) 108 and a plurality of digital-to-analog converters $110_1$-$110_k$ (hereinafter individually referred to as a "DAC 110" or collectively referred to as "DACs 110") coupled to the SPC 108. In one example, each DAC 110 corresponds to one column 106 of the plurality of columns 106; thus, the plurality of DACs 110 includes at least a first DAC $110_1$ corresponding to the first column $106_1$ and a second DAC $110_2$ corresponding to the second column $106_2$. The SPC 108 is configured to extract serial pixel data from a signal 114 sent by a remote graphics controller and to digitally convert the serial pixel data to parallelized pixel data, which is subsequently converted by the DACs 110 to analog values $116_1$-$116_p$ (hereinafter individually referred to as "analog value 116" or collectively referred to as "analog values 116") for each column 106 of the display device 100.

In one example, the display device 100 further includes a plurality of switches $112_1$-$112_{k-1}$ (hereinafter individually referred to as a "switch 112" or collectively referred to as "switches 112"). Each switch 112 corresponds to one column 106 of the plurality of columns 106. In one example, the number of switches 112 in the display device is one fewer than the number of columns 106. For instance, the first column $106_1$ of the example display device 100 may not have a corresponding switch 112. Thus, a first switch $112_1$ of the plurality of switches 112 may correspond to the second column $106_2$ of the plurality of columns 106. In one example, at least one of the switches 112 may comprise multiplexer.

In one example, each switch 112 is coupled between the SPC 108 and one of the DACs 110. Taking the first switch $112_1$ as an example, each switch 112 includes a first input 120 coupled directly to an input of an adjacent column 106 and a second input 122 coupled directly to an output of the SPC 108. In one example, the adjacent column 106 is the column immediately to the left. Thus, the first input 120 of the first switch $112_1$ is coupled to an input of the first column $106_1$ (i.e., to an input of the first DAC $110_1$). Each switch 112 further includes an output 124 coupled to an input of a corresponding column 106 (i.e., to an input of a corresponding DAC 110). Thus, the output 124 of the first switch $112_1$ is coupled to an input of the second column $106_2$ (i.e., to an input of the second DAC $110_2$).

A controller 118 is configured to extract a command from the signal 114 sent by the remote graphics controller. In response to the command, the controller 118 instructs each switch 112 to select pixel data for output to its corresponding DAC 110. For instance, the controller 118 will instruct the first switch $112_1$ to select pixel data on either its first input 120 or pixel data on its second input 122 for output to the second DAC $110_2$. Thus, the first switch $112_1$ selects the pixel data for a subset of the plurality of pixels residing in the second column $106_2$.

The display device 100 has been simplified for ease of illustration. Those skilled in the art will appreciate that the display device 100 may include addition components, such as drivers, transistors, and capacitors, which are not illustrated.

In operation, an image may be rendered on the display device 100 beginning with a "vertical sync." Pixel data (e.g., component intensities for pixels) is transferred to the first (e.g., top most, left most) pixel $102_1$, which is located at the intersection of the first row $104_1$ and the first column $106_1$. Pixel data transfer continues along the first row $104_1$ (e.g., moving left to right) to transfer pixel data to the remaining pixels 102 in the first row $104_1$, until the pixel at the intersection of the first row $104_1$ and the last column $106_k$ is reached. A "horizontal sync" command may then reset the column to the first column $106_1$ and increment the row to the next row (i.e., the second row $104_2$). Pixel data transfer may resume with the first (e.g., left most) pixel of the second row $104_2$, which is located at the intersection of the second row $104_2$ and the first column $106_1$. Pixel data transfer continues along the second row $104_2$ (e.g., moving left to right) to transfer pixel data to the remaining pixels 102 in the second row $104_2$, until the pixel at the intersection of the second row $104_2$ and the last column $106_k$ is reached. Pixel data transfer may continue in this manner, row-by-row, until pixel data is transferred to the final (e.g., bottom most, right most) pixel $102_n$, which is located at the intersection of the last row $104_m$ and the last column $106_k$. As pixel data is transferred in this manner, the pixel data for each pixel 102 is selected by the switch 112 of the column 106 in which the pixel 102 resides.

In one example, the controller 118 may communicate with the SPC 108 to modify the SPC's column indexing operations during the rendering of an image. For instance, where there is a 1:1 correspondence between packets of pixel data and columns, the SPC 108 would index across the columns as the packets are received. However, in accordance with examples of the present disclosure, the controller 118 may instruct the SPC 108 to skip indexing of one or more columns for which a unique packet of pixel data is not received (i.e., columns that reuse pixel data from a previous column).

Figure 2:
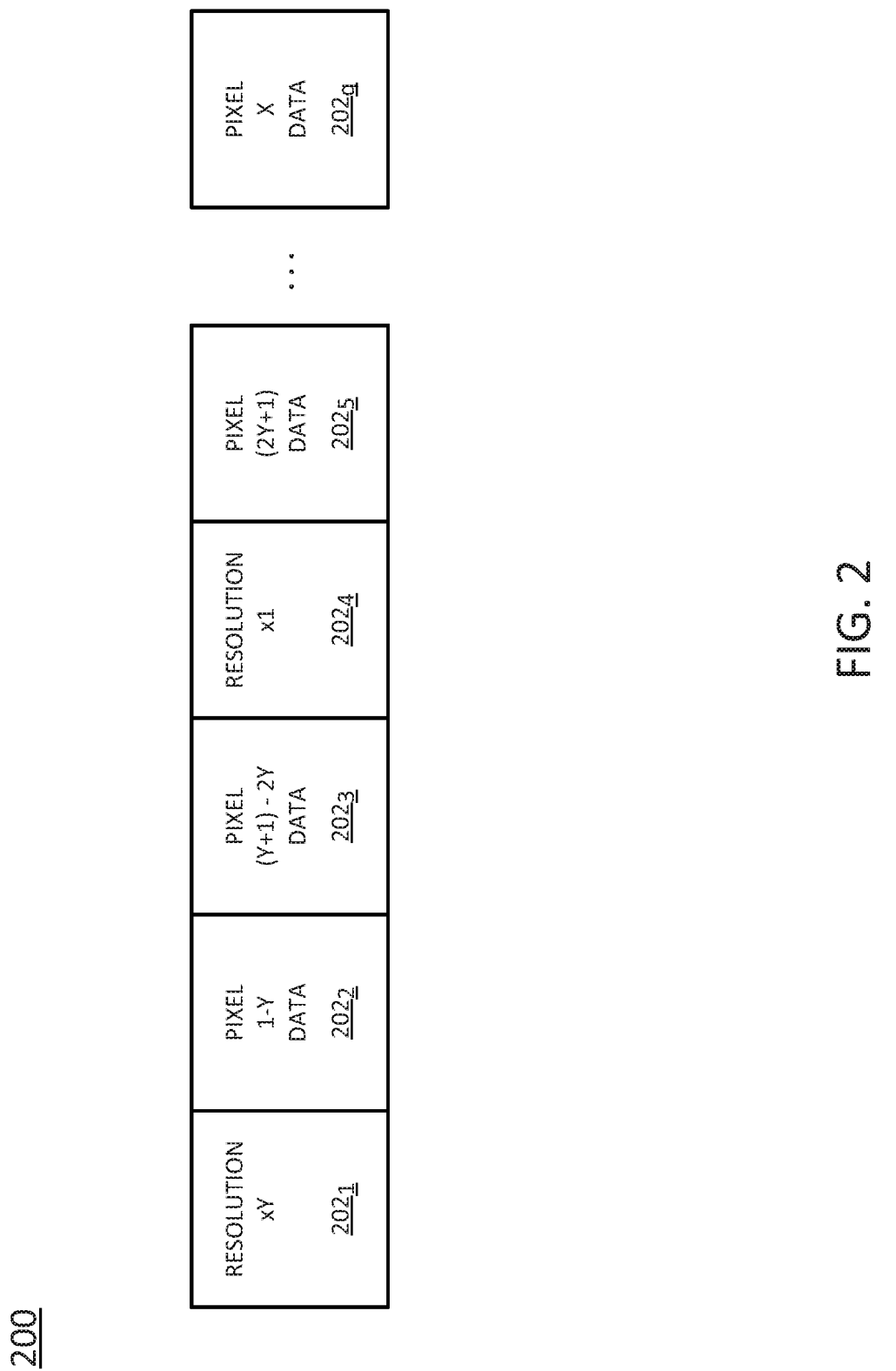
FIG. 2 illustrates an example signal that may be sent to a display device by a remote graphics controller.

FIG. 2 illustrates an example signal 200 that may be sent to a display device by a remote graphics controller. The signal 200 may be similar to the signal 114 illustrated in FIG. 1. As illustrated in FIG. 2, the signal 200 may include a plurality of packets $202_1$-$202_q$ (hereinafter individually referred to as a "packet 202" or collectively referred to as "packets 202"). The plurality of packets 202 includes at least a first packet $202_1$ and a second packet $202_2$.

In the example shown in FIG. 2, the first packet $202_1$ of the signal 200 includes a first command, i.e., "Resolution x [times] Y." This first command indicates that a subset of the serial pixel data included in an immediately subsequent packet will be shared by a series of Y consecutive pixels of the display device (where "consecutive" indicates the order in which the pixels are rendered, e.g., moving from left to right and top to bottom).

The second packet $202_2$ and the third packet $202_3$ follow the first packet $202_1$ and include the pixel data to be shared by two separate series of Y consecutive pixels. For instance, the second packet $202_2$ includes pixel data for pixels 1-Y, while the third packet $202_3$ includes pixel data for pixels (Y+1)-2Y.

The fourth packet $202_4$ includes a second command, i.e., "Resolution×1." This second command indicates a subset of the serial pixel data included in an immediately subsequent packet will be used by one pixel of the display device. The fifth packet $202_5$ includes the subset of the serial pixel data to be used by the one pixel (2Y+1).

Thus, according to the example signal 200, rendering of an image begins with groups of Y consecutive pixels sharing a subset of the serial pixel data. That is, the pixel data will change every Y pixels. For instance, pixels 1-Y share a first packet of pixel data (i.e., packet $202_2$), pixels (Y+1)-2Y share a second packet of pixel data (i.e., packet $202_3$), and so on, until a new command is received that changes the number of pixels sharing pixel data. In the example of FIG. 2, this new command is received in packet $202_4$ and indicates that, until another new command is received, each pixel will be rendered using unique (unshared) pixel data.

Thus, the spatial resolution of pixels 1 through 2Y is relatively low (as pixel data is shared) compared to the spatial resolution of pixel (2Y+1) (as pixel data is unique or unshared). In this way, the spatial resolution of individual pixels may be varied in a manner that supports foveated rendering of an image.

Moreover, by sending pixel data once for the entire group of pixels that share the pixel data (e.g., as in the case of packets $202_2$ and $202_3$, which are each shared by four pixels), as opposed to sending individual pixel data for each of the pixels in the group, the amount of data sent over the link between the image source (e.g., graphics controller) and the display device may be reduced. As such, valuable link bandwidth may be conserved, allowing for improved image fidelity and faster image rendering.

Although FIGS. 1 and 2 illustrate a display device and signal configuration in which pixel data is reused across columns of the display device, in other examples, pixel data may be reused along rows instead of or in addition to across columns. In this case, the signal could include a command that indicates that pixel data in designated packets is to be reused for one or more subsequent rows of the display device.

Figure 3:
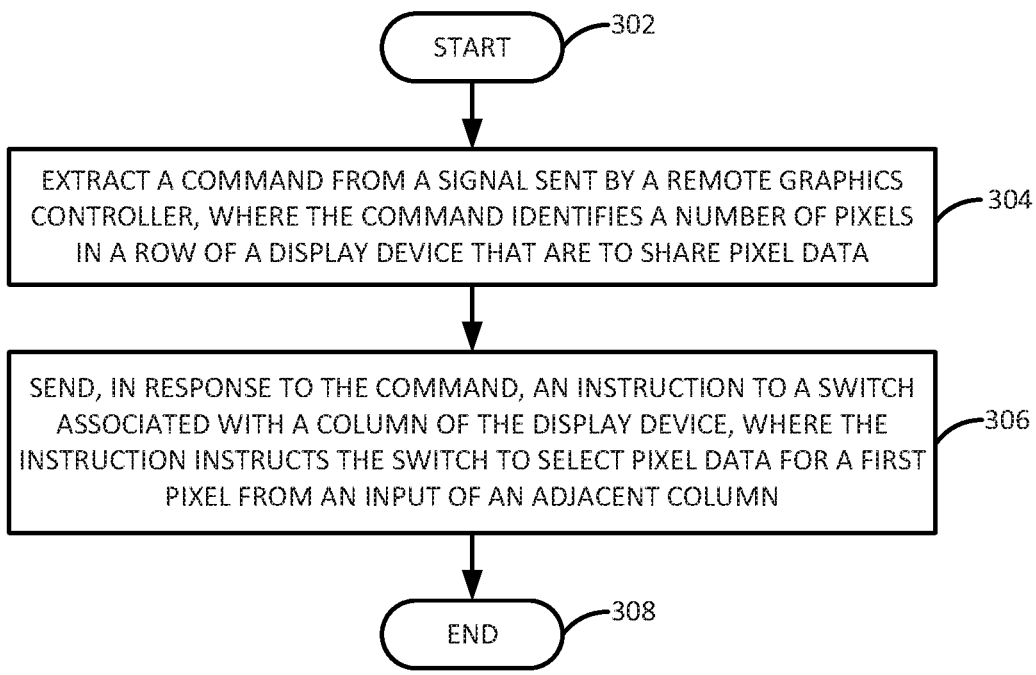
FIG. 3 is a flow diagram illustrating an example method for rendering an image on a display device.
Figure 4:
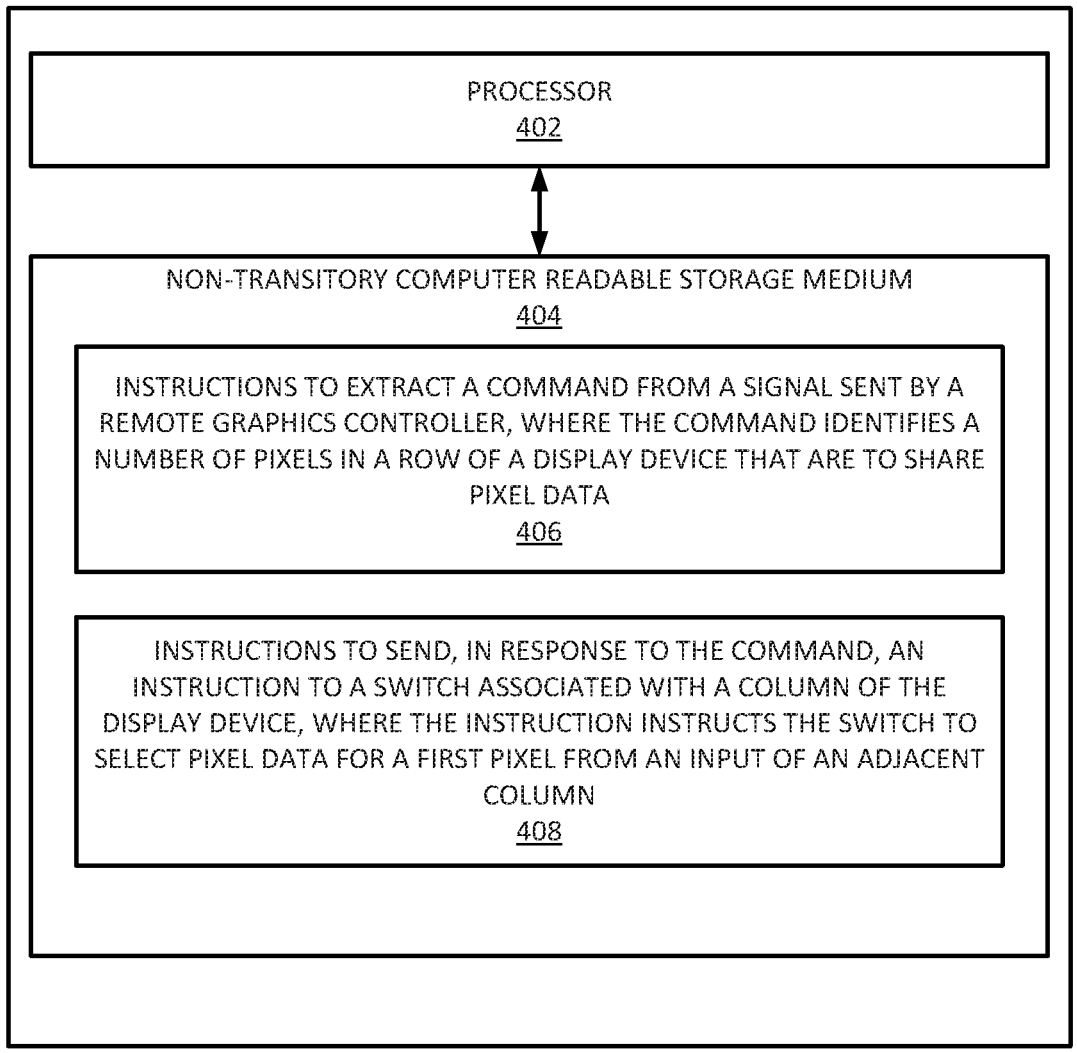
FIG. 4 illustrates an example of an apparatus.

FIG. 3 is a flow diagram illustrating an example method 300 for rendering an image on a display device. The method 300 may be performed, for instance, by the controller 118 of the display device 100 of FIG. 1, or by a device as illustrated in FIG. 4. As such, reference may be made in the discussion of the method 300 to various components of the display device 100. Such references are made for the sake of example, however, and do not limit the means by which the method 300 may be implemented.

The method 300 begins in block 302. In block 304, a command is extracted from a signal sent by a remote graphics controller. The signal may be transmitted from the remote graphics controller via a wired cable and/or a wireless network connection. In one example, the command identifies a number of pixels in a row of a display device that are to share pixel data (e.g., an analog value describing component intensities of a pixel).

For instance, referring back to FIG. 2, the first packet $202_1$ of the signal 200 includes the first command, i.e., "Resolution×Y." This command indicates that pixel data included in the packets that follow will be shared by series of Y consecutive pixels of the display device, until a second command is received that changes the spatial resolution. That second command, received in the fourth packet $202_4$ of the signal 200, indicates that pixel data included in the packets that follow will apply to single pixels of the display device, until a third command is received that again changes the spatial resolution, and so on.

Referring back to FIG. 3, in block 306 and responsive to the command extracted in block 304, an instruction is sent to a switch associated with a column of the display device, where the column contains a pixel affected by the command. The instruction instructs the switch associated with the column to select the pixel data for the pixel from the input of an adjacent (e.g., immediately previous, or immediately to the left) column. In this case, the pixel is sharing the pixel data with at least one other pixel in its row in a consecutive series (e.g., with another pixel in the adjacent column).

The method 300 ends in block 308.

The method 300 may repeat as pixel data is transferred to additional pixels of the display, and as additional commands are extracted from the signal. For instance, as noted above, the signal may include commands that change the spatial resolution along a row (e.g., changing from multiple pixels sharing one set of pixel data to single pixels using unique pixel data and vice versa).

It should be noted that although not explicitly specified, some of the blocks, functions, or operations of the method 300 described above may include storing, displaying and/or outputting for a particular application. In other words, any data, records, fields, and/or intermediate results discussed in the method 300 can be stored, displayed, and/or outputted to another device depending on the particular application. Furthermore, blocks, functions, or operations in FIG. 3 that recite a determining operation, or involve a decision, do not necessarily imply that both branches of the determining operation are practiced.

FIG. 4 illustrates an example of an apparatus 400. In one example, the apparatus 400 may be the controller 118 of FIG. 1. In one example, the apparatus 400 may include a processor 402 and a non-transitory machine readable storage medium 404. The non-transitory machine readable storage medium 404 may include instructions 406 and 408 that, when executed by the processor 402, cause the processor 402 to perform various functions.

The instructions 406 may include instructions to extract a command from a signal sent by a remote graphics controller. The command may identify a number of pixels in a row of a display device that are to share pixel data (e.g., an analog value describing component intensities of a pixel). The instructions 408 may include instructions to send an instruction, responsive to the command, to a switch associated with a column of the display device, where the column contains the first pixel affected by the command (it should be noted that in this context, the term "first pixel" is used to differentiate one pixel from another, and does not necessarily refer to the first pixel $102_1$ of FIG. 1). The instruction may instruct the switch associated with the column to select the pixel data for the first pixel from the input of an adjacent (e.g., immediately previous, or immediately to the left) column. In this case, the first pixel is sharing the pixel data with at least one other pixel in a consecutive series.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A display device, comprising:
   a plurality of pixels arranged in a plurality of rows and a plurality of columns, wherein the plurality of columns includes a first column and a second column adjacent to the first column;
   a serial-to-parallel converter to generate parallelized pixel data based on serial pixel data sent by a graphics controller;
   a plurality of digital-to-analog converters coupled to the serial-to-parallel converter, wherein the plurality of digital-to-analog converters includes a first digital-to-analog converter corresponding to the first column and a second digital-to-analog converter corresponding to the second column;
   a plurality of switches, wherein the plurality of switches includes a first switch corresponding to the second column, the first switch comprising:
      a first input coupled directly to an input of the first column;
      a second input coupled to an output of the serial-to-parallel converter; and
      an output coupled to an input of the second column; and
   a controller to couple one of the first input and the second input to the output of the switch, wherein coupling the first input to the output of the switch results in a reuse of pixel data for the first column by the second column, and wherein coupling the second input to the output of the switch results in use of the parallelized pixel data for the second column.

2. The display device of claim 1, wherein the display device is a head mounted display.

3. The display device of claim 1, wherein the first switch is to select, for a subset of the plurality of pixels residing in the second column and responsive to a command from the graphics controller, pixel data from the first column when the controller couples the first input to the output of the switch and the parallelized pixel data when the controller couples the second input to the output of the switch.

4. The display device of claim 3, wherein the serial pixel data comprises:
   a command identifying a number of pixels of the plurality of pixels; and
   a subset of the serial pixel data to be shared by the number of pixels.

5. The display device of claim 4, wherein a number of switches in the plurality of switches is one fewer than a number of columns in the plurality of columns.

6. The display device of claim 1, wherein the controller is further to extract a command from a signal sent by the graphics controller and to send, responsive to the command, an instruction to the first switch, where the instruction instructs the first switch to select pixel data for a pixel residing in the second column from the input of the first column.

7. The display device of claim 6, wherein the pixel residing in the second column is located in a region of the display device that is on a periphery of a viewer's gaze.

8. The display device of claim 7, wherein a spatial resolution of an image displayed on the display device is lower in the region relative to other regions of the display device.

9. The display device of claim 6, wherein the signal comprises:
   a first packet identifying a number of pixels in a row of the plurality of rows; and
   a second packet following the first packet and containing serial pixel data to be shared by the number of pixels.

* * * * *